United States Patent
Crupnicoff et al.

(10) Patent No.: US 10,237,376 B2
(45) Date of Patent: Mar. 19, 2019

(54) HARDWARE-BASED CONGESTION CONTROL FOR TCP TRAFFIC

(71) Applicant: Mellanox Technologies Ltd., Yokneam (IL)

(72) Inventors: Diego Crupnicoff, Buenos Aires (AR); Michael Kagan, Zichron Yaakov (IL); Noam Bloch, Bat Shlomo (IL); Adi Menachem, Hod Hasharon (IL); Idan Burstein, Carmiel (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 88 days.

(21) Appl. No.: 15/278,143

(22) Filed: Sep. 28, 2016

(65) Prior Publication Data

US 2017/0093699 A1    Mar. 30, 2017

Related U.S. Application Data

(60) Provisional application No. 62/234,046, filed on Sep. 29, 2015.

(51) Int. Cl.
*H04L 12/801* (2013.01)
*H04L 29/06* (2006.01)
(Continued)

(52) U.S. Cl.
CPC ............ *H04L 69/16* (2013.01); *H04L 47/263* (2013.01); *H04L 47/33* (2013.01); *H04L 47/28* (2013.01); *Y02D 50/10* (2018.01)

(58) Field of Classification Search
CPC ....... H04L 47/263; H04L 47/32; H04L 47/10; H04L 47/12; H04L 47/35; H04L 43/0894;
(Continued)

(56) References Cited

U.S. PATENT DOCUMENTS

| 5,400,329 A | 3/1995 | Tokura et al. |
| 5,442,624 A | 8/1995 | Bonomi et al. |

(Continued)

FOREIGN PATENT DOCUMENTS

| EP | 2068511 A1 | 6/2009 |
| WO | 2009046869 A1 | 4/2009 |
| WO | 2015123988 A1 | 8/2015 |

OTHER PUBLICATIONS

U.S. Appl. No. 15/225,859 Office Action dated Nov. 13, 2017.
(Continued)

*Primary Examiner* — Marsha D Banks Harold
*Assistant Examiner* — Elton Williams
(74) *Attorney, Agent, or Firm* — Kligler & Associates

(57) ABSTRACT

A method for congestion control includes receiving at a destination computer a packet transmitted on a given flow, in accordance with a predefined transport protocol, through a network by a transmitting network interface controller (NIC) of a source computer, and marked by an element in the network with a forward congestion notification. Upon receiving the marked packet in a receiving NIC of the destination computer, a congestion notification packet (CNP) indicating a flow to be throttled is immediately queued for transmission from the receiving NIC through the network to the source computer. Upon receiving the CNP in the transmitting NIC, transmission of further packets on at least the flow indicated by the CNP from the transmitting NIC to the network is immediately throttled, and an indication of the given flow is passed from the transmitting NIC to a protocol processing software stack running on the source computer.

18 Claims, 1 Drawing Sheet

(51) Int. Cl.
*H04L 12/825* (2013.01)
*H04L 12/841* (2013.01)

(58) Field of Classification Search
CPC .. H04L 47/28; H04L 47/147; H04W 28/0284; H04W 28/0289; H04W 28/042
USPC ............... 370/229, 230, 236, 231, 235, 412
See application file for complete search history.

(56) References Cited

U.S. PATENT DOCUMENTS

| | | | |
|---|---|---|---|
| 5,463,620 A | 10/1995 | Sriram | |
| 5,751,969 A | 5/1998 | Kapoor | |
| 6,081,524 A | 6/2000 | Chase et al. | |
| 6,188,671 B1 | 2/2001 | Chase et al. | |
| 6,724,721 B1 | 4/2004 | Cheriton | |
| 6,741,555 B1* | 5/2004 | Li | H04L 47/10 370/229 |
| 6,859,435 B1 | 2/2005 | Lee et al. | |
| 6,980,520 B1 | 12/2005 | Erimli | |
| 7,000,025 B1 | 2/2006 | Wilson | |
| 7,061,868 B1 | 6/2006 | Ahlfors et al. | |
| 7,200,116 B2 | 4/2007 | Kobayashi | |
| 7,573,827 B2 | 8/2009 | Santos et al. | |
| 7,602,712 B2 | 10/2009 | Johnsen et al. | |
| 7,706,255 B1 | 4/2010 | Kondrat et al. | |
| 7,830,889 B1 | 11/2010 | Lemaire et al. | |
| 7,839,779 B2 | 11/2010 | Singla et al. | |
| 8,174,978 B2 | 5/2012 | Naven et al. | |
| 8,201,168 B2 | 6/2012 | Haviv et al. | |
| 8,345,548 B2 | 1/2013 | Gusat et al. | |
| 8,379,515 B1 | 2/2013 | Mukerji | |
| 8,391,144 B1 | 3/2013 | Pannell et al. | |
| 8,705,349 B2 | 4/2014 | Bloch et al. | |
| 8,811,183 B1 | 8/2014 | Anand et al. | |
| 8,867,356 B2 | 10/2014 | Bloch et al. | |
| 9,660,914 B1 | 5/2017 | Zhou et al. | |
| 2003/0026267 A1 | 2/2003 | Oberman et al. | |
| 2004/0202169 A1 | 10/2004 | Mukouyama et al. | |
| 2005/0105466 A1 | 5/2005 | Chase et al. | |
| 2006/0045089 A1 | 3/2006 | Bacher et al. | |
| 2006/0088036 A1 | 4/2006 | De Prezzo | |
| 2006/0156164 A1 | 7/2006 | Meyer et al. | |
| 2008/0056125 A1 | 3/2008 | Kneckt et al. | |
| 2008/0075003 A1 | 3/2008 | Lee et al. | |
| 2008/0232251 A1 | 9/2008 | Hirayama et al. | |
| 2008/0304413 A1 | 12/2008 | Briscoe et al. | |
| 2009/0052326 A1 | 2/2009 | Bergamasco et al. | |
| 2009/0086637 A1 | 4/2009 | Decusatis et al. | |
| 2009/0178037 A1 | 7/2009 | Winter et al. | |
| 2009/0268614 A1 | 10/2009 | Tay et al. | |
| 2010/0027420 A1 | 2/2010 | Smith | |
| 2010/0088437 A1 | 4/2010 | Zahavi | |
| 2010/0098072 A1 | 4/2010 | Satterlee et al. | |
| 2011/0032819 A1 | 2/2011 | Schliwa-Bertling et al. | |
| 2011/0242973 A1 | 10/2011 | Ge et al. | |
| 2012/0051216 A1* | 3/2012 | Zhang | H04L 47/12 370/230 |
| 2012/0155276 A1 | 6/2012 | Vasseur et al. | |
| 2012/0195200 A1 | 8/2012 | Regan | |
| 2013/0003538 A1 | 1/2013 | Greenberg et al. | |
| 2013/0124753 A1 | 5/2013 | Ansari et al. | |
| 2013/0289926 A1 | 10/2013 | Maity et al. | |
| 2014/0064082 A1 | 3/2014 | Yeung et al. | |
| 2014/0185616 A1 | 7/2014 | Bloch et al. | |
| 2014/0269301 A1 | 9/2014 | Rungta et al. | |
| 2014/0269321 A1 | 9/2014 | Kamble et al. | |
| 2015/0009817 A1 | 1/2015 | Sato | |
| 2015/0029853 A1 | 1/2015 | Raindel et al. | |
| 2015/0055478 A1 | 2/2015 | Tabatabaee et al. | |
| 2015/0103667 A1 | 4/2015 | Elias et al. | |
| 2015/0172169 A1* | 6/2015 | DeCusatis | H04L 45/14 718/1 |
| 2015/0372918 A1 | 12/2015 | Zhou et al. | |
| 2016/0014029 A1 | 1/2016 | Yuan et al. | |

OTHER PUBLICATIONS

U.S. Appl. No. 14/052,743 Office Action dated Jan. 12, 2017.
IEEE Standard 802.1Qau for Local and metropolitan area networks—"Virtual Bridged Local Area Networks", Amendment 13: Congestion Notification, pp. 1-135, Apr. 23, 2010.
Infiniband Trade Association, "Infiniband Architecture Specification", vol. 1, release 1.2.1, Annex A10, pp. 1650-1697, Nov. 2007.
IEEE, 802.3, "Standard for Information technology—Telecommunications and information exchange between systems—Local and metropolitan area networks—Specific requirements" Part 3: Carrier Sense Multiple Access with Collision Detection (CSMA/CD) Access Method and Physical Layer Specifications Corrigendum 1: Timing Considerations for Pause Operation, 12 pages, Jan. 2009.
Mahalingam et al, "VXLAN: A Framework for Overlaying Virtualized Layer 2 Networks over Layer 3 Networks", draft-mahalingam-dutt-dcops-vxlan-02.txt, Network Working Group, Internet Draft, 20 pages, Aug. 22, 2012.
Ramakrishnan et al, "The Addition of Explicit Congestion Notification (ECN) to IP", Network Working Group, RFC 3168, 63 pages, Sep. 2001.
Allman et al, "TCP Congestion Control", Network Working Group, RFC 2581, 14 pages, Apr. 1999.
Zahavi et al., "On the Relation Between Congestion Control, Switch Arbitration and Fairness," 11th IEEE/ACM International Symposium on Cluster, Cloud and Grid Computing (CCGrid), pp. 23-26, May 2011.
IEEE Standard 802.1Qbb for Local and metropolitan area networks—"Media Access Control (MAC) Bridges and Virtual Bridged Local Area Networks", Amendment 17: Priority-based Flow Control, pp. 1-40, Sep. 30, 2011.
Allman et al., "TCP Congestion Control", Request for Comments (RFC) 5681 of the Internet Engineering Task Force (IETF), 18 pages, Sep. 2009.
IEEE Standard 802.3 for Information technology—"Telecommunications and information exchange between systems", Local and metropolitan area networks, pp. 1-628, Dec. 9, 2005.
Sridharan et al, "NVGRE: Network Virtualization using Generic Routing Encapsulation", draft-sridharan-virtualization-nvgre-01.txt, Network Working Group, Internet Draft, 17 pages, Jul. 9, 2012.
Chu et al, "Transmission of IP over InfiniBand (IPoIB)", Network Working Group, RFC 4391, 21 pages, Apr. 2006.
Jacquet et al., "Re-ECN: Adding Accountability for Causing Congestion to TCP/IP"—draft-briscoe-tsvwg-re-ecn-tcp-09, pp. 1-50, Oct. 25, 2010.
Jiang et al., "Forward Explicit Congestion Forward Explicit Congestion Notification (FECN) for Notification (FECN) for Datacenter Ethernet Networks", IEEE 802.1au Congestion Notification Group Interim Meeting, 60 pages, Mar. 12-15, 2007.
U.S. Appl. No. 14/730,257 Office Action dated Sep. 20, 2016.
Shpiner et al., U.S. Appl. No. 14/730,257, filed Jun. 4, 2015.
Goldenberg et al., U.S. Appl. No. 15/225,859, filed Feb. 8, 2016.
U.S. Appl. No. 14/052,743 Office Action dated Aug. 8, 2011.

* cited by examiner

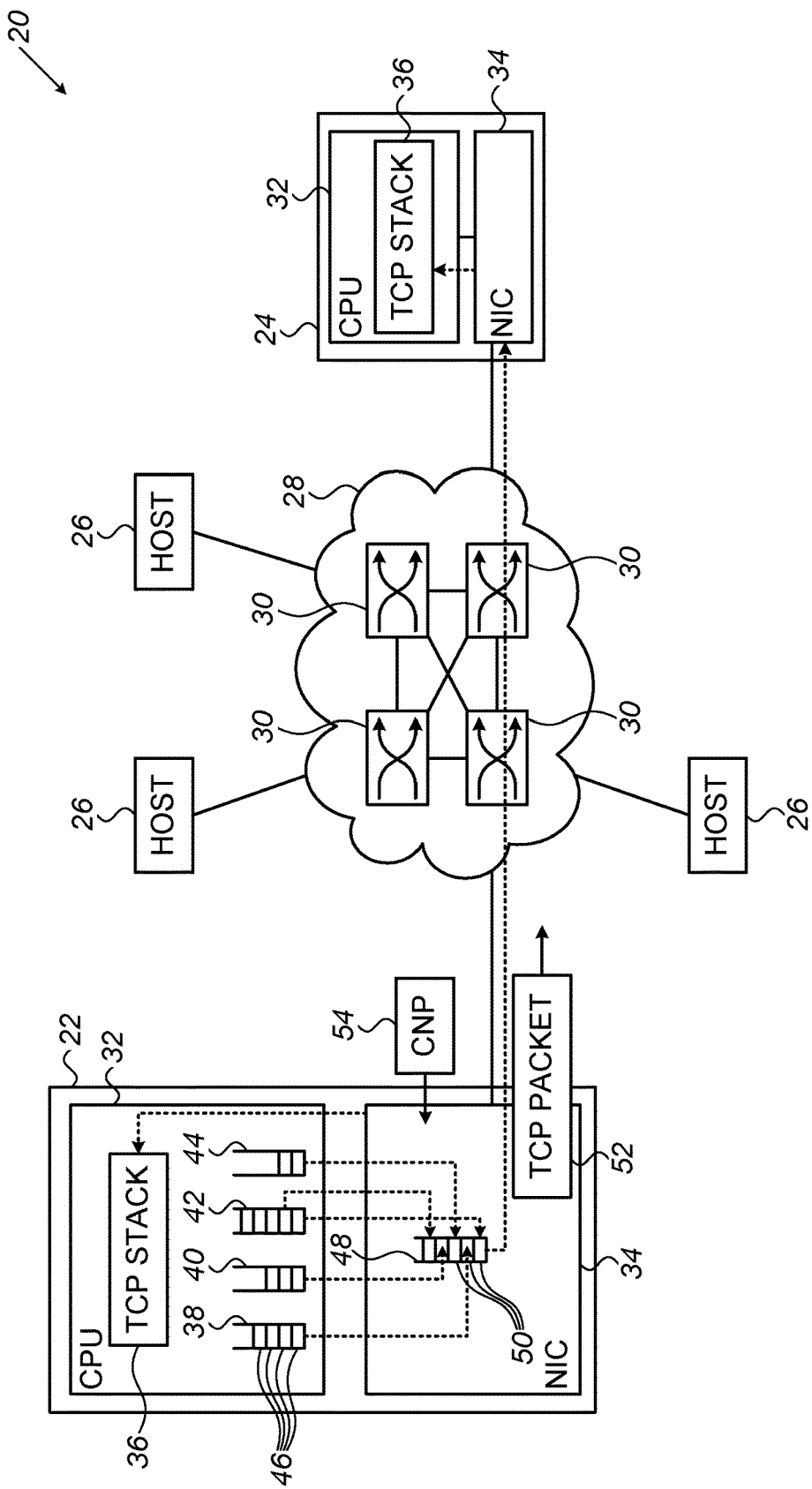

HARDWARE-BASED CONGESTION CONTROL FOR TCP TRAFFIC

CROSS-REFERENCE TO RELATED APPLICATION

This application claims the benefit of U.S. Provisional Patent Application 62/234,046, filed Sep. 29, 2015, which is incorporated herein by reference.

FIELD OF THE INVENTION

The present invention relates generally to computer communication networks, and specifically to apparatus and methods for controlling packet flows in such networks.

BACKGROUND

Current high-performance applications inject increasingly unpredictable bursty traffic into data center networks, causing network congestion and degrading their own and other applications' performance. Congestion control protocols have been developed to alleviate these problems. These protocols inform traffic sources about the congestion in the network. Using this information, the traffic sources reduce the injection rate of their traffic. When congestion is not indicated, the traffic sources continually attempt to increase their traffic injection rates. The performance of the congestion control mechanism depends on several factors, such as notification delay, accuracy of notification, and the trigger of congestion.

Congestion control protocols for large-scale data centers are based mainly on forward explicit congestion notification (FECN), meaning that the congestion notification is propagated first from the detection point to the destination and is then reflected back from the destination to the traffic source. Typically, congested switches send notifications to the destinations of packets that they forward by setting a specific FECN bit in the packet headers. Direct BECN-based feedback (backward explicit congestion notification), meaning that the congestion notification is returned directly from the congested switch to the traffic source, is currently used generally only in smaller, Layer-2 networks.

When the network interface controller (NIC) at the destination of a given flow receives a packet with the FECN bit set, the NIC is expected to notify the source of the packet about the congestion$_2$. The NIC typically sends this notification by returning a packet to the source of the flow with a BECN bit set. In InfiniBand® networks, for example, the NIC may either send an acknowledgement packet (ACK) with the BECN bit set, when communicating with the packet source over a reliable connection, or it may send a dedicated congestion notification packet (CNP).

Internet Protocol (IP) networks, on the other hand, commonly use the Transmission Control Protocol (TCP) as their transport-layer protocol. The congestion control features of TCP are set forth by Allman et al., in "TCP Congestion Control," Request for Comments (RFC) 5681 of the Internet Engineering Task Force (IETF), published in 2009, which is incorporated herein by reference. This document specifies four TCP congestion control algorithms: slow start, congestion avoidance, fast retransmit and fast recovery. The slow start and congestion avoidance algorithms are used by TCP senders to control the amount of outstanding data being injected into the network. To implement these algorithms, two variables are added to the TCP per-connection state: The congestion window (cwnd) is a sender-side limit on the amount of data the sender can transmit into the network before receiving an acknowledgment (ACK), while the receiver's advertised window (rwnd) is a receiver-side limit on the amount of outstanding data. The minimum of cwnd and rwnd governs data transmission. Upon encountering an indication of congestion, the receiver instructs the sender to reduce the window size, and the sender reduces the transmission rate accordingly.

SUMMARY

Embodiments of the present invention that are described hereinbelow provide improved methods for network congestion control, as well as apparatus that implements such methods.

There is therefore provided, in accordance with an embodiment of the invention, a method for congestion control, which includes receiving at a destination computer a packet transmitted on a given flow, in accordance with a predefined transport protocol, through a network by a transmitting network interface controller (NIC) of a source computer, and marked by an element in the network with a forward congestion notification. Upon receiving the marked packet in a receiving NIC of the destination computer, a congestion notification packet (CNP) indicating a flow to be throttled is immediately queued for transmission from the receiving NIC through the network to the source computer. Upon receiving the CNP in the transmitting NIC, transmission of further packets on at least the flow indicated by the CNP from the transmitting NIC to the network is immediately throttled, and an indication of the given flow is passed from the transmitting NIC to a protocol processing software stack running on the source computer.

In the disclosed embodiments, the CNP is transmitted and the transmission is throttled by the receiving and transmitting NICs without waiting for processing of the marked packet or the CNP by software processes running on CPUs of the destination and source computers. Additionally or alternatively, the method includes reducing, by the protocol processing software stack in response to the indication, a transmission rate of the packets in the given flow. In one embodiment, throttling the transmission includes initially reducing a rate of the transmission by the transmitting NIC and subsequently gradually increasing the rate of the transmission by the transmitting NIC while the protocol processing software stack continues to maintain the reduced transmission rate of the packets in the given flow.

In some embodiments, the CNP contains an indication of a severity of congestion in the network, and the transmitting NIC adjusts the throttling of the transmission responsively to the indication.

In one embodiment, the predefined transport protocol includes a Transmission Control Protocol (TCP), and the given flow includes a TCP connection.

Typically, the transmitting NIC, in response to the CNP, throttles the packets that are queued with the flow indicated by the CNP, without modifying a transmission rate of the packets in other queues.

There is also provided, in accordance with an embodiment of the invention, a method for congestion control, which includes receiving on a given Transmission Control Protocol (TCP) connection at a destination computer a TCP packet transmitted through a network by a transmitting network interface controller (NIC) of a source computer, and marked by an element in the network with a forward congestion notification. Upon receiving the marked TCP packet in a receiving NIC of the destination computer, a congestion notification packet (CNP) is immediately queued for transmission from the receiving NIC through the network to the source computer. Upon receiving the CNP in the transmitting NIC, transmission of further TCP packets from the transmitting NIC to the network is immediately throttled in the NIC.

Typically, the CNP is transmitted and the transmission is throttled by the receiving and transmitting NICs without waiting for processing of the marked TCP packet or the CNP by software processes running on CPUs of the destination and source computers.

Additionally or alternatively, the method includes reducing, by a TCP software stack running on the source computer, a transmission rate of the packets on the given TCP connection. In some embodiments, the method includes, in response to receiving the CNP, passing an indication of the given TCP connection from the transmitting NIC to the TCP software stack running on the source computer, wherein the TCP software stack reduces the transmission rate of the packets on the given TCP connection in response to the indication. In one such embodiment, passing the indication includes conveying a message from the NIC to the TCP software stack that emulates a TCP congestion control messaging.

Additionally or alternatively, the TCP software stack reduces the transmission rate of the packets on the given TCP connection in response to TCP congestion control messaging received from the destination computer.

Further additionally or alternatively, throttling the transmission includes initially reducing a rate of the transmission by the transmitting NIC and subsequently gradually increasing the rate of the transmission by the transmitting NIC, while the TCP software stack running on the source computer continues to maintain the reduced transmission rate of the packets in the given connection.

There is additionally provided, in accordance with an embodiment of the invention, a computer network system, including multiple host computers interconnected by a packet network and configured to serve as source computers and destination computers for transmission and reception of packet flows through the network. Each host computer includes a central processing unit (CPU) and a network interface controller (NIC), which connects the host computer to the network. Upon receiving in a receiving NIC of a destination computer a packet that was transmitted through the network by a transmitting NIC of a source computer on a given flow in accordance with a predefined transport protocol and that was marked by an element in the network with a forward congestion notification, the receiving NIC immediately queues a congestion notification packet (CNP) indicating a flow to be throttled, for transmission through the network to the source computer. Upon receiving the CNP in the transmitting NIC, the transmitting NIC immediately throttles transmission of further packets on at least the flow indicated by the CNP from the transmitting NIC to the network, and passes an indication of the given flow from the transmitting NIC to a protocol processing software stack running on the source computer.

There is further provided, in accordance with an embodiment of the invention, a computer network system, including multiple host computers interconnected by a packet network and configured to serve as source computers and destination computers for transmission and reception of packet flows through the network. Each host computer includes a central processing unit (CPU) and a network interface controller (NIC), which connects the host computer to the network. Upon receiving in a receiving NIC of a destination computer a Transmission Control Protocol (TCP) packet that was transmitted through the network by a transmitting NIC of a source computer on a given TCP connection and that was marked by an element in the network with a forward congestion notification, the receiving NIC immediately transmits a congestion notification packet (CNP) through the network to the source computer. Upon receiving the CNP in the transmitting NIC, the transmitting NIC immediately throttles transmission of further TCP packets from the transmitting NIC to the network.

The present invention will be more fully understood from the following detailed description of the embodiments thereof, taken together with the drawing in which:

BRIEF DESCRIPTION OF THE DRAWINGS

FIG. 1 is a block diagram that schematically illustrates a computer network system, in accordance with an embodiment of the invention.

DETAILED DESCRIPTION OF EMBODIMENTS

In IP networks, TCP processing is typically handled by the host processor (CPU) using a TCP software stack. The NICs that receive and transmit the TCP packets do not usually distinguish between different TCP transport service instances—referred to as sockets or connections—and thus cannot distinguish between congesting and non-congesting flows. Therefore, TCP congestion control is also generally implemented in software.

Congestion can develop very rapidly in data center environments, due, for example, to the well-known "incast" problem. Fast response of the congestion control mechanism is important in resolving such situations and maintaining high system performance. When FECN is used, the speed of response is limited, in the best case, by the round-trip transmission time between the source and destination NICs. In networks using TCP transport, however, the response to congestion is further limited by the processing required by the TCP software stacks at both the destination and the source of the congesting flow. Embodiments of the present invention that are described herein provide devices and techniques that can mitigate this problem.

Specifically, the embodiments of the present invention that are disclosed herein provide methods for hardware-based congestion control in TCP environments, as well as NICs and software that support such methods. In the disclosed embodiments, a NIC receiving a TCP packet containing a congestion indication immediately transmits a congestion notification packet (CNP) to the source of the TCP packet, without waiting for destination-side CPU software to handle the TCP packet. The NIC at the packet source, upon receiving the CNP, immediately reduces its transmission rate, thus relieving the congestion. Concurrently, when the source-side TCP software stack becomes aware of the congestion, the TCP stack responds by reducing the transmission rate, of the specific connection that is responsible for the congestion. The NIC gradually increases its transmission rate thereafter, while the transmission rate of the congesting connection generally recovers more slowly.

By implementing front-line congestion control in the NIC, the present methods achieve faster response than techniques that are known in the art. At the same time, the present methods are able to rapidly reduce the injection rate of connections that contribute to congestion with only minimal impact on the performance of non-congesting connections. In some embodiments, the NIC coordinates its role in congestion control with that of the TCP software stack. In other embodiments, however, the NIC carries out its role without any explicit interaction with the TCP stack.

Although the embodiments described herein apply specifically, for the sake of clarity and concreteness, to control of congestion in packet flows having the form of TCP connections, the principles of the present invention may similarly be applied to flows transmitted in accordance with other transport protocols. Such flows may be identified, for example, on the basis of a flow label in the IP header or by a suitable tuple in the packet header, including the source and destination addresses and ports and the protocol identifier, for instance. On this basis, the principles of the present invention may also be applied to connectionless protocols, such as UDP.

FIG. 1 is a block diagram that schematically illustrates a computer network system 20, in accordance with an embodiment of the invention. Multiple host computers 22, 24, 26, . . . , are interconnected by a high-speed network 28, such as a fabric of switches 30. Each host computer 22, 24, 26, . . . , comprises a CPU 32 and a NIC 34, which connects the computer to network 28. The computers exchange data by transmitting and receiving TCP packets, under the control of TCP stacks 36 that run in software on the respective CPUs 32.

Typically, all of computers 22, 24, 26, . . . , both transmit and receive packets over TCP connections via network 28. In the description that follows, however, for the sake of simplicity, computer 22 will be referred to as the source computer, while computer 24 is referred to as the destination computer. TCP stack 36 on computer 22 maintains multiple sockets 38, 40, 42, 44, . . . , for connections with other computers 24, 26, . . . , in system 20, including, for example, socket 42 connecting to a corresponding socket maintained by TCP stack 36 on destination computer 24. TCP stack 36 on computer 22 queues TCP frames 46 in sockets 38, 40, 42, 44, and submits corresponding packets to NIC 34 for transmission at rates that depend on the current window size and acknowledgments received on each corresponding connection.

NIC 34 queues TCP packets 50 for transmission in one or more send queues 48, and transmits the packets in turn to network 28 when they reach the head of the queue. (Although for the sake of simplicity, only one send queue 48 is shown in FIG. 1, NIC 34 may serve multiple queues of this sort concurrently.) Send queue 48 in NIC 34, in other words, serves multiple different connections to different destinations, i.e., multiple different flows (in contrast to the InfiniBand model, in which the NIC typically maintains a separate QP for each flow, as explained above). Because TCP stack 36 runs in software, NIC 34 is generally unaware of the different flows that it is serving and simply transmits packets 50 in each of the send queues in queue order.

In the pictured example, NIC 34 in source computer 22 transmits a TCP packet 52, drawn from queue 42, via network 28 to destination computer 24. Along the way, packet 52 encounters congestion in one of switches 30, which sets the ECN bit in the packet. Switch 30 typically sets the ECN bit in the IP header of the packet, and is thus agnostic to the transport protocol. In some cases, such as in network virtualization schemes, the TCP packet may be encapsulated in a packet having an outer transport header in accordance with another transport protocol, such as UDP. In this case, when the TCP packet is decapsulated, the decapsulating network element will apply the ECN marking to the inner TCP packet so that the congestion notification is carried through to the destination.

Upon receiving packet 52 and detecting the ECN bit, NIC 34 in destination computer 24 immediately queues a CNP 54 for transmission via network back to source computer 22. Typically, CNP 54 indicates the flow that should be throttled at the source computer, for example by identifying the connection (in this case, socket 42) that transmitted the congesting packet. Additionally or alternatively, CNP 54 may contain other congestion-related information, such as an indication of the severity of congestion, based, for example, on the fraction of packets received at destination computer 24 with the ECN bit set. This additional information may enable NIC 34 in source computer 22 to more finely control its response to the congestion notification.

NIC 34 in destination computer 24 queues CNP 54 for transmission immediately upon receiving packet 52, without waiting for processing by TCP stack 36 or other software running on CPU 32. Assuming network 28 supports multiple priority levels, NIC 34 will typically transmit CNP 54 at the highest priority, higher than the priority normally allocated to TCP packets, in order to minimize the transit time through network 28. NIC 34 in source computer 22 likewise acts immediately upon receiving CNP 54, throttling back the transmission rate of packets 50 from queue 48 to network 28 so that the congestion encountered by packet 50 will be promptly relieved. This throttling may affect the packets that share the same queue with the packets belonging to the flow indicated by the CNP (in queue 48), but does not modify the transmission rate of the packets in other NIC queues.

Throttling queue 48, however, can cause head-of-line blocking of frames 46 waiting for transmission in sockets 38, 40 and 44, which did not contribute to the current congestion situation. To alleviate this sort of blocking, NIC 34 in source computer 22 also notifies TCP stack 36 that CNP 54 has been received, implicating socket 42 as a cause of the congestion in question. In response to this notification, TCP stack 36 temporarily cuts back the transmission from socket 42 in accordance with the TCP congestion control protocol. This interaction between NIC 34 and TCP stack 36 may involve certain modifications to operate with conventional TCP software that is known in the art; but it may alternatively be possible to elicit the desired TCP behavior by conveying messages from NIC 34 that emulate congesting messaging provided by the TCP standard. Alternatively, the present method may be implemented without any explicit interaction between the NIC and TCP stack following reception of CNP 54, and rather may rely simply on TCP signaling from destination computer 24 in order to reduce the rate of transmission from socket 42.

In any of these cases, because transmission from congesting socket 42 is cut back by TCP stack 36, NIC 34 can quickly ramp up the transmission rate from queue 48 after the initial reduction, without concern of exacerbating the congestion once again, since the contribution of the congesting socket 42 will have been reduced in accordance with TCP congestion management. Thus, after brief initial blocking upon receipt of CNP 54, sockets 38, 40 and 42 will be able to resume transmission at the full speed permitted by the software-based TCP congestion control.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for congestion control, comprising:

receiving at a destination computer a packet transmitted on a given flow, in accordance with a predefined transport protocol, through a network by a transmitting network interface controller (NIC) of a source computer, and marked by an element in the network with a forward congestion notification;

upon receiving the marked packet in a receiving NIC of the destination computer, immediately queuing a congestion notification packet (CNP) indicating a flow to be throttled, for transmission from the receiving NIC through the network to the source computer;

upon receiving the CNP in the transmitting NIC, immediately throttling transmission of further packets on at least the flow indicated by the CNP from the transmitting NIC to the network, and passing an indication of the given flow from the transmitting NIC to a protocol processing software stack running on the source computer;

reducing, by the protocol processing software stack in response to the indication, a transmission rate of the packets in the given flow; and after initially throttling the transmission and passing the indication to the protocol processing software stack, subsequently increasing the rate of the transmission by the transmitting NIC of other flows while the protocol processing software stack continues to maintain the reduced transmission rate of the packets in the given flow.

2. The method according to claim 1, wherein the CNP is transmitted and the transmission is throttled by the receiving and transmitting NICs without waiting for processing of the marked packet or the CNP by software processes running on CPUs of the destination and source computers.

3. The method according to claim 1, wherein the CNP contains an indication of a severity of congestion in the network, and wherein the transmitting NIC adjusts the throttling of the transmission responsively to the indication.

4. The method according to claim 1, wherein the predefined transport protocol comprises a Transmission Control Protocol (TCP), and wherein the given flow comprises a TCP connection.

5. The method according to claim 1, wherein the transmitting NIC, in response to the CNP, throttles the packets that are queued with the flow indicated by the CNP, without modifying a transmission rate of the packets in other queues.

6. A method for congestion control, comprising:

receiving on a given Transmission Control Protocol (TCP) connection at a destination computer a TCP packet transmitted through a network by a transmitting network interface controller (NIC) of a source computer, and marked by an element in the network with a forward congestion notification;

upon receiving the marked TCP packet in a receiving NIC of the destination computer, immediately queuing a congestion notification packet (CNP) for transmission from the receiving NIC through the network to the source computer;

upon receiving the CNP in the transmitting NIC, immediately throttling, in the NIC, transmission of further TCP packets from the transmitting NIC to the network and passing an indication of the given TCP connection from the transmitting NIC to a TCP software stack running on the source computer;

reducing, by the TCP software stack running on the source computer, a transmission rate of the packets on the given TCP connection in response to the indication; and after initially throttling the transmission and passing the indication to the protocol processing software stack, subsequently increasing the rate of the transmission by the transmitting NIC of other flows while the TCP software stack continues to maintain the reduced transmission rate of the packets on the given TCP connection.

7. The method according to claim 6, wherein the CNP is transmitted and the transmission is throttled by the receiving and transmitting NICs without waiting for processing of the marked TCP packet or the CNP by software processes running on CPUs of the destination and source computers.

8. The method according to claim 6, wherein passing the indication comprises conveying a message from the NIC to the TCP software stack that emulates a TCP congestion control messaging.

9. The method according to claim 6, wherein the TCP software stack reduces the transmission rate of the packets on the given TCP connection in response to TCP congestion control messaging received from the destination computer.

10. A computer network system, comprising multiple host computers interconnected by a packet network and configured to serve as source computers and destination computers for transmission and reception of packet flows through the network, each host computer comprising a central processing unit (CPU) and a network interface controller (NIC), which connects the host computer to the network, wherein upon receiving in a receiving NIC of a destination computer a packet that was transmitted through the network by a transmitting NIC of a source computer on a given flow in accordance with a predefined transport protocol and that was marked by an element in the network with a forward congestion notification, the receiving NIC immediately queues a congestion notification packet (CNP) indicating a flow to be throttled, for transmission through the network to the source computer, and wherein upon receiving the CNP in the transmitting NIC, the transmitting NIC immediately throttles transmission of further packets on at least the flow indicated by the CNP from the transmitting NIC to the network, and passes an indication of the given flow from the transmitting NIC to a protocol processing software stack running on the source computer, and wherein the protocol processing software stack running on the source computer causes the CPU of the source computer, in response to the indication, to reduce a transmission rate of the packets in the given flow, and wherein after initially throttling the transmission and passing the indication to the protocol processing software stack, the transmitting NIC subsequently increases the rate of the transmission of other flows while the protocol processing software stack continues to maintain the reduced transmission rate of the packets in the given flow.

11. The system according to claim 10, wherein the CNP is transmitted and the transmission is throttled by the receiving and transmitting NICs without waiting for processing of the marked packet or the CNP by software processes running on CPUs of the destination and source computers.

12. The system according to claim 10, wherein the CNP contains an indication of a severity of congestion in the network, and wherein the transmitting NIC adjusts the throttling of the transmission responsively to the indication.

13. The system according to claim 10, wherein the predefined transport protocol comprises TCP, and wherein the given flow comprises a TCP connection.

14. The system according to claim 10, wherein the transmitting NIC, in response to the CNP, throttles the packets that are queued with the flow indicated by the CNP, without modifying a transmission rate of the packets in other queues.

15. A computer network system, comprising multiple host computers interconnected by a packet network and configured to serve as source computers and destination computers for transmission and reception of packet flows through the network, each host computer comprising a central processing unit (CPU) and a network interface controller (NIC), which connects the host computer to the network, wherein upon receiving in a receiving NIC of a destination computer a Transmission Control Protocol (TCP) packet that was transmitted through the network by a transmitting NIC of a source computer on a given TCP connection and that was marked by an element in the network with a forward congestion notification, the receiving NIC immediately transmits a congestion notification packet (CNP) through the network to the source computer, and wherein upon receiving the CNP in the transmitting NIC, the transmitting NIC immediately throttles transmission of further TCP packets from the transmitting NIC to the network and passes an indication of the given TCP connection to a TCP software stack running on the source computer, wherein the TCP software stack running on the source computer causes the CPU of the source computer, in response to the indication, to reduce a transmission rate of the packets on the given TCP connection, and wherein after initially throttling the transmission and passing the indication to the protocol processing software stack, the transmitting NIC subsequently increases the rate of the transmission of other flows while the TCP software stack continues to maintain the reduced transmission rate of the packets on the given TCP connection.

16. The system according to claim 15, wherein the CNP is transmitted and the transmission is throttled by the receiving and transmitting NICs without waiting for processing of the marked TCP packet or the CNP by software processes running on CPUs of the destination and source computers.

17. The system according to claim 16, wherein the indication comprises a message conveyed from the NIC to the TCP software stack that emulates a TCP congestion control messaging.

18. The system according to claim 16, wherein the TCP software stack reduces the transmission rate of the packets on the given TCP connection in response to TCP congestion control messaging received from the destination computer.

* * * * *